3,591,665
PROCESS FOR PRODUCING PHYTIC ACID
Goro Kimura, Kamakura, Eiichi Noda, Hisagi Zushi, Hideaki Takeuchi, Yokohama, and Koji Tsukushiro, Isehara-machi, Japan, assignors to Mitsui Toatsu Chemicals Incorporated, Tokyo, Japan
No Drawing. Filed Sept. 8, 1967, Ser. No. 666,448
Int. Cl. C07f 9/08
U.S. Cl. 260—983            10 Claims

ABSTRACT OF THE DISCLOSURE

Phytic acid is obtained by extracting phytin from cereals, brans, glutens, embryos, plant seeds and/or their defatted sediments with a dilute aqueous solution of an acid, precipitating the phytin by adding an alkaline substance so as to adjust the pH of the extract to the alkaline side, filtering and dispersing it in water, treating the dispersion with a cation exchange resin and then with a weak anion exchange resin, and concentrating it. The phytic acid thus obtained is useful as a metal-inactivator in fats and oils, a stabilizer of various foods and food products, a stabilizer of vitamins, a softener of water, an antioxidant of fats and oils, a corrosion inhibitor for many metals and as an additive in fermentation.

---

This invention relates to a process for producing concentrated phytic acid characterized by adding a dilute aqueous solution of an inorganic acid and/or an organic acid to such raw materials as cereals, brans, glutens, embryos, plant seeds or their defatted sediments, extracting them with an acid to obtain an acid extract, then adding such alkaline substance as sodium hydroxide, potassium hydroxide or ammonia or its aqueous solution to the extract after or without adding such hydrophilic organic solvent as methanol, ethanol or acetone thereto so as to adjust the pH to the alkaline side, precipitating and fractionating phytin, washing the phytin well, then dispersing it in water, treating the dispersion directly with a strong cation exchange resin, then concentrating it, then treating it with a weak anion exchange resin and then concetrating it.

The phytic acid obtained in the present invention is a hexaphosphate of i-(myo- or meso-type) inositol. Processes for producing such phytic acid are shown in U.S. Pats. 2,691,035, 2,718,523 and 2,750,400.

These United States patents disclose methods of producing a water-soluble phytate or phytic acid by stirring a raw material, such as, water-insoluble calcium phytate, magnesium phytate or calcium-magnesium phytate, as a slurry together with a cation exchange resin and dilute hydrochloric acid, dilute phytic acid or water as a solvent and then filtering the slurry or passing it through a cation exchange resin cylinder. According to Example 1 in U.S. Pat. 2,691,035 and Example 1 in U.S. Pat. 2,718,523, the raw material calcium phytate consists of 14.1% water, 22.6% calcium, 20.4% total phosphorus, 18.5% organic phosphorus and 0.07% total nitrogen. According to Example 2 in U.S. Pat. 2,718,523, the calcium-magnesium phytate consists of 11.3% water, 16.2% calcium, 3.7% magnesium, 16.8% total phosphorus, 15.6% organic phosphorus and 0.8% total nitrogen. According to Example 3 in U.S. Pat. 2,691,035, the magnesium phytate consists of 15.6% water, 5.2% calcium, 11.3% magnesium, 21.8% total phosphorus, 19.5% organic phosphorus and 0.3% total nitrogen. Further, according to Example 3 in U.S. Pat. 2,718,523, it consists of 20.7% water, 4.7% calcium, 10.9% magnesium, 20.2% total phosphorus, 19.0% organic phosphorus and 0.2% total nitrogen.

In the prior art method wherein the raw material phytin is dissolved in an inorganic acid such as dilute hydrochloric acid or dilute sulfuric acid and then cations are isolated by using a cation exchange resin, special apparatus is required to remove the inorganic acid after the concentration of phytic acid and is disadvantageous in that anticorrosive materials are necessary and production costs are relatively high. When more than 1% inorganic acid is mixed into phytic acid, the polymerization and blackish brown coloring of phytic acid is caused. Therefore, this method is not desirable.

In this respect, the prior art method wherein a phytin suspension is treated directly with a cation exchange resin by using water as a solvent has various advantages as compared with the method wherein an inorganic acid is used as a solvent.

However, when a phytate of such alkaline earth metals as calcium phytate, calcium-magnesium phytate or magnesium phytate is stirred and suspended in large amounts of water, such as more than 10 to 20 times as large, the pH will be usually 6.5 to 6.8 (as mentioned in Examples 1 and 3 in U.S. Pat. 2,718,523) and the phytate will be substantially insoluble in water. For example, calcium phytate is soluble to the extent of about 1 mg. in 100 g. of water at 30° C. or about only 1.5 mg. even at 80° C. Therefore, even when a suspension of this kind of phytate and a strong cation exchange resin are brought into contact with each other, the exchange of cations between the ion exchange resin and the phytate of the alkaline earth metal will not occur immediately. That is to say, the time for the induction of the ion exchange reaction will be so long as to usually require more than 2 to 10 minutes.

Furthermore, when a phytate of an alkaline earth metal stirred and suspended in water is passed through a cation exchange resin, the solid phytate will clog in the resin grains and subsequent passing of the suspension becomes difficult. Therefore, it is usual to use an amount of water which is more than 10 to 20 times as large as the amount of the alkaline earth metal phytate and to employ hard stirring with the cation exchange resin for more than 30 minutes under warming at about 20 to 30° C. or 40 to 50° C. to lower the pH of the entire liquid mixture to the acid side, e.g., a pH of 2 to 4. The greater part of the insoluble phytate is converted to a mixed solution of a water-soluble phytate and phytic acid which is then passed through an ion exchange resin cylinder so that the cations of the alkaline earth metal may be exchanged and removed to obtain phytic acid.

However, in this method, when the aqueous suspension of the phytate of the alkaline earth metal and the cation exchange resin are stirred hard at room temperature for more than 1 minute, the grains of the resin will be broken to a fine granular powder by the mechanical friction and subsequent use becomes impossible. When they are stirred under warming, specifically above 40° C., the breaking rate will further increase.

Consequently, there has been considered a method wherein an alkali metal substance is made to act on the alkaline earth metal phytate so that a part of its cations may be replaced with alkali metal ions. However, this reaction is so difficult that mixtures of phytates of the alkali metal and alkaline earth metal are not easily obtained. Even if a concentrated aqueous solution of an alkali is used or they are heated to above 60° C., hydrolysis takes place initially and the phytate is decomposed into inositol and inorganic phosphoric acid.

Furthermore, conventional methods of producing phytic acid have been considered to replace only the cations of phytin with a cation exchange resin. However, it is usual that slight amounts of free phosphoric acid and other inorganic acids are mixed as impurities in the raw material phytin. In order to obtain pure phytic acid, these impurities must be removed also.

The phytin prepared by the process of the present invention is obtained by replacing a part of the cations inherently coupled with phytin in cereals, brans, glutens, embryos or plant seeds with a part of alkali metal cations or ammonium cations from compounds which are precipitants and, thus, 93 to 98% of the phytin in the raw material has been successfully separated as a precipitate. In order to replace a part of cations of the phytin with those of the precipitants, it is necessary to keep the pH above 7 by using such an alkaline substance as sodium hydroxide, potassium hydroxide or ammonia as a precipitating medium.

The phytin present in cereals, brans, glutens or embryos is phytic acid coupled with a metal, such as, calcium, magnesium or potassium. The content and metal composition ratio are different depending on the categories, kinds and origins of the cereals, brans, glutens and embryos. In most cases, in phytin present in plants there are present 12 to 18% by weight of an alkaline earth metal and several percent by weight of an alkali metal, mostly potassium. For example, according to detailed researches made by the present inventors, the phytin in rice brans produced in Hokkaido, Tohoku and Kanto Districts in Japan is approximately of a composition of $C_6H_6O_{24}P_6$—$Mg_4Ca$—$K_2$ and the phytin in rice brans produced in Shikoku and Kyushu Districts in Japan is approximately of a composition of $C_6H_6O_{24}P_6Mg_3Ca_2K_2$.

The acid solvent used in the process of the present invention is a dilute aqueous solution of an inorganic acid or organic acid and is preferably of a concentration of 0.2 to 10%. The amount of the solvent used is 5 to 30 times as much as the weight of the raw material and the extracting temperature used is 5 to 70° C. Under these conditions, when the above-mentioned rice bran phytin is extracted, the phytin in the extract will be washed out in a form in which potassium is replaced with hydrogen ions, e.g., $C_6H_6O_{24}P_6Mg_{3-4}Ca_{1-2}H_2$. Therefore, when sodium hydroxide is used as the precipitant, sodium will replace the hydrogen and, when ammonia water is used, ammonium, $NH_4$, will replace the hydrogen. Therefore, the chemical formula of the phytin obtained from rice brans produced in Hokkaido, Tohoku and Kanto Districts corresponds to $C_6H_6O_{24}P_6Mg_4CaNa_2$ or $$C_6H_6O_{24}P_6Mg_4Ca(NH_4)_2$$

The phytin precipitated by adding an alkaline substance to a dilute acid extract of a bran to adjust the pH of the solution to the alkaline side as in the present invention is phytic acid mixed and coupled with an alkaline earth metal and an alkali metal or ammonium cation. It has been found that, when such phytin is dispersed in water and is passed through a strong cation exchange resin and then anions are passed through the exchange resin, phytic acid will be produced far more advantageously than before.

It has been unexpectedly discovered that, by the use of this invention, not only is the period for inducing the cation exchange with the strong cation exchange resin reduced to about 10 to 20 seconds but, also, since the alkali metal or ammonia has been partly substituted in the phytin produced by the process of the present invention, the alkali metal or ammonia in the phytin will first exchange ions, and as a result the solution will be acidified, the phytin body will become soluble in it, the subseqeunt ion exchange of the alkaline earth metal will proceed easily and there will be no danger that insoluble phytin will clog the ion exchange resin at all.

What is more important is that it has become clear that, in the present invention, as the strong cation exchange resin is combined with the weak anion exchange resin, the free phosphoric acid and other inorganic acids which could not be removed before can be selectively adsorbed and separated.

The process for producing phytic acid according to the present invention is an improved method which produces phytic acid high in stability at a low cost from phytin in the form in which an alkali metal hydroxide or ammonia used as precipitants are partly substituted in the phytin resulting in, for example, ammonium, sodium or potassium-calcium-magnesium phytin.

The solubility of the raw material phytin in water in the process of the persent invention is 0.01 to 0.1 g. in 100 g. of water at 30° C. The pH, when the raw material phytin is suspended in water of an alkalinity of more than 7, is usually 7.5 to 9.0. The alkali metal or ammonium ions coupled with the raw material phytin are so much higher in dissociation degree than the calcium and magnesium ions that, when the phytin comes into contact with the cation exchange resin, the alkali metal or ammonium ions will be first immediately exchanged for the hydrogen of the ion exchange resins, the solution becomes acid, the partly converted phytin becomes soluble in this acid solution and the ion exchanging speed in turn increases.

In the process of the present invention, phytin is precipitated and fractionated, the obtained paste is well washed with pure water or alkaline water of a pH of more than 7 to remove protein, then an aqueous dispersion prepared by suspending the paste is passed through a cation exchange resin cylinder to form an aqueous solution of phytic acid of a pH of less than 1.5, the solution is treated with such decolorizing agent as active carbon, it is passed through a weak anion exchange resin cylinder to remove the inorganic acids, e.g., phosphoric acid and the acid part of the solvent used for extracting phytin, and then the solution is concentrated to the desired concentration of phytic acid.

If more than 1% of a free inorganic acid is allowed to co-exist in phytic acid, the polymerization and reddish brown or balekish brown coloring of phytic acid will result. Therefore, it must be removed, for example by the use of a weak anion exchange resin.

The phytic acid obtained by the present invention is useful as a chelating agent, an antioxidant or a fermentate. For example, it is useful as a metal-inactivator in fats and oils (edible oils, citrus oils, perfume oils, mineral oils, etc.), a stabilizer of beverages (juice, cider, cola, beer, wine, etc.), a stabilizer of vitamins C, a softener of water, an antioxidant of fats and oils, for preventing struvite in tinned provisions, for preventing corrosion and rust of metal (Fe, Zn, Cu, Ni, Co, Cd, W and Mn, etc.), and as an additive in fermentation (lactic acid fermentation, riboflavin fermentation, etc.).

The following examples are presented. All parts and percentages are on a weight basis.

EXAMPLE 1

One kg. of a defatted rice bran was stirred in 10 liters of an aqueous solution of 0.5% sulfuric acid at room temperature for 1 hour to extract phytin. The rice bran residue was separated by filtration and then 28% ammonia water was added to the resulting filtrate until the pH became 9.2. The produced phytin (ammonium-calcium-magnesium phytin $C_6H_6O_{24}P_6 \cdot Mg_4Ca(NH_4)_2$) was filtered under a reduced pressure with a Nutsch filter. The phytin was washed with 1 liter of ammonia water of a pH of 9.2. It was then stirred in 1 liter of distilled water at 50° C. for 1 hour, washed and filtered repeatedly three times. The protein and inorganic salts contained in the phytin were thus removed. When the residue was dried at 110 to 120° C. and was then crushed, 111.5 g. of dry ammonium-calcium-magnesium phytin was obtained.

The result of the analysis of this phytin was 20.16% total phosphorus, 18.33% organic phosphorus, 3.0% ammonium ($NH_4$), 4.444% calcium, 10.06% magnesium and 12.1% water. When 100 g. of this phytin were suspended in 1 liter of distilled water, the pH of the suspension was 8.4. When the suspension was passed at the rate of 20 to 30 cc./min. through 1 liter of an H-type strong acid cation exchange resin (Amberlite IR 120— obtained by regeneration with hydrochloric acid) contained in a glass cylinder of a diameter of 6 cm. and a height of 45 cm., in the upper part of the cylinder, the ammonium ions were replaced with hydrogen ions, then replacement of the magnesium and calcium ions by hydrogen ions occurred in the order mentioned and 1.1 liters of a transparent flowing solution were obtained at the bottom of the column. The pH of this solution was 0.86. The solution contained no cations of ammonia, calcium and magnesium but contained small amounts of sulfuric acid ions and phosphoric acid ions.

The solution was then concentrated to 500 cc. at a temperature below 50° C. and at a reduced pressure of 30 mm. Hg. Then, 150 cc. of an OH-type weak anion exchange resin (Amberlite IR 45—regenerated with a 2 N-aqueous solution of sodium hydroxide) were placed in a cylinder of a diameter of 3 cm. and a height of 25 cm. When 500 cc. of the above-mentioned concentrated solution were passed at a flow rate of 10 to 20 cc./min. from the upper part of the cylinder, 500 cc. of an aqueous solution of phytic acid containing no sulfuric acid ions or phosphoric acid ions were obtained. The pH of the resulting solution was 0.73. The resulting aqueous solution of phytic acid was treated with active carbon so as to decolorize it and then was concentrated at a bath temperature below 50° C. and a reduced pressure of 30 mm. Hg until it became syrupy. 88.76 g. of a concentrated solution of 72.13% phytic acid were obtained.

The yield from the ammonium-calcium-magnesium phytin was 98.93%.

EXAMPLE 2

Phytin was extracted in 10 liters of an aqueous solution of 1.5% hydrochloric acid by using 1.2 kg. of a raw rice bran. After it was filtered, an aqueous solution of 20% sodium hydroxide was added to the extract until the pH was 9.0. When the produced sodium-calcium-magnesium phytin was filtered, was treated in the same manner as in Example 1 and was dried, 113.4 g. of sodium-magnesium-calcium phytin $C_6H_6O_{24}Mg_4CaNa_2$ were obtained.

This phytin contained 20.39% total phosphorus, 18.54% organic phosphorus, 4.59% sodium, 4.48% calcium, 10.16% magnesium and 9.4% water. When 100 g. of this phytin were suspended in 1 liter of distilled water, the pH of the suspension was 8.5.

When the same operation as in Example 1 was then carried out, 85.82 g. of a concentrated solution of 74.51% phytic acid were obtained. The yield from the raw material sodium-calcium-magnesium phytin was 97.64%.

EXAMPLE 3

Ten liters of an aqueous solution of 2% acetic acid were added to 1 kg. of a defatted rice bran and the mixture was stirred and extracted at 30° C. for 30 minutes. After the extract was filtered, 9 liters of a phytin extract were obtained. Nine liters of 95% methanol and an aqueous solution of 25% potassium hydroxide were added to the extract to adjust the pH to 9.2. When the produced phytin was filtered under increased pressure, was washed with 3 liters of 95% methanol and was dried at 60° C. under reduced pressure, 104.3 g. of potassium-calcium-magnesium phytin $C_6H_6O_{24}CaMg_4K_2$ were obtained.

This phytin contained 19.51% total phosphorus, 17.75% organic phosphorus, 4.32% calcium 10.41% magnesium, 7.46% potassium and 10.3% water. When 100 g. of the phytin were suspended in 1 liter of water, the pH of the resulting suspension was 8.5.

When the same operation as described in Example 1 was carried out on this suspension, using 1.2 liters of an H-type strong cation exchange resin, Amberlite XE 100 regenerated with hydrochloric acid instead of the strong cation exchange resin IR 120 used in Example 1, and using 100 cc. of the weak anion exchange resin, Amberlite IR4B regenerated with sodium hydroxide instead of IR 45, 86.32 g. of a concentrated solution of 73.21% phytic acid were obtained.

The yield based on the potassium-magnesium-calcium phytin was 94.81%.

EXAMPLE 4

Thirty liters of an aqueous solution of 0.2% sulfuric acid were added to 3 kg. of a defatted gluten. Phytin was extracted and filtered. 20% ammonia water was added to this extract until the pH was 8.6. The produced phytin was filtered. When the phytin separated by filtration was refined, dried and crushed by the same process as in Example 1, 103.8 g. of ammonium-calcium-magnesium phytin were obtained. The result of the analysis of this phytin was 20.49% total phosphorus, 18.68% organic phosphorus, 9.8% water, 3.64% ammonium $NH_4$, 4.51% calcium and 10.23% magnesium. When the same operation as described in Example 1 was then carried out by using 100 g. of the resulting phytin extract, 85.47 g. of a concentrated solution of 75.31% phytic acid were obtained. The yield based on the ammonium-calcium-magnesium phytin was 97.59%.

EXAMPLE 5

Forty liters of an aqueous solution of 1% acetic acid were added to 4 kg. of a wheat bran. Phytin was extracted. After the extract was filtered, 28% ammonia water was added to the extract until the pH was 9.0. When the produced phytin was filtered and was then washed and dried, 112.3 g. of ammonium-calcium-magnesium phytin were obtained. This phytin was of 20.81% total phosphorus, 18.93% organic phosphorus, 3.73% ammonium $NH_4$, 4.57% calcium, 10.40% magnesium and 8.5% water. When 100 g. of this phytin were then treated in the same manner as in Example 3, 87.24 g. of a concentrated solution of 74.41% phytic acid were obtained. The yield was 97.13% based on the ammonium-magnesium-calcium phytin.

What is claimed is:

1. A process for producing phytic acid which comprises the steps of extracting phytin from a raw material selected from the group consisting of brans, glutens and defatted sediments thereof with a dilute aqueous solution of an acid selected from the group consisting of sulfuric, hydrochloric and acetic acids to form an acid extract, precipitating the phytin by adding an alkaline substance selected from the group consisting of sodium hydroxide, potassium hydroxide, ammonia and aqueous solutions thereof to adjust the pH of the extract to the alkaline side, filtering the extract, forming a dispersion of the resulting phytin in water, treating the dispersion with a cation exchange resin and then with a weak anion exchange resin.

2. A process as claimed in claim 1 wherein the concentration of acid in the dilute aqueous solution is in the range of 0.2 to 2 weight percent and the quantity of the dilute aqueous solution is in the range of 5 to 30 times as much as the raw material.

3. A process as claimed in claim 1 wherein a hydrotrophilic organic solvent selected from the class consisting of methanol, ethanol and acetone is added to the acid extract.

4. A process as claimed in claim 1 wherein the temperature of the extracting step is in the range of 5 to 70° C.

5. A process as claimed in claim 1 wherein after the treatment with a cation exchange resin and then a weak anion exchange resin the solution is treated with activated charcoal.

6. Process as claimed in claim 1 wherein said alkaline substance is ammonia.

7. Process as claimed in claim 1 wherein said alkaline substance is sodium hydroxide.

8. Process as claimed in claim 1 wherein said alkaline substance is potassium hydroxide.

9. Process as claimed in claim 1 wherein said acid is sulfuric acid.

10. Process as claimed in claim 1 wherein said acid is hydrochloric acid.

References Cited

UNITED STATES PATENTS 2,815,360  12/1957  Baldwin _____ 260—983

CHARLES B. PARKER, Primary Examiner

A. H. SUTTO, Assistant Examiner

U.S. Cl. X.R.

99—150R, 155; 252—389, 400; 260—343.7, 398.5; 928, 987